United States Patent [19]
Spier

[11] 3,971,084
[45] July 27, 1976

[54] HULL CONSTRUCTION AND METHOD FOR FORMING SAME

[76] Inventor: I. Martin Spier, 50 Park Ave., New York, N.Y. 10016

[22] Filed: Mar. 7, 1974

[21] Appl. No.: 449,188

[52] U.S. Cl. .................................. 9/6 P; 114/67 R; 114/222
[51] Int. Cl.² .......................................... B63B 5/24
[58] Field of Search .................. 9/6; 114/222, 67 A, 114/67 R; 115/11

[56] References Cited
UNITED STATES PATENTS

| | | | |
|---|---|---|---|
| 994,405 | 6/1911 | James | 114/222 |
| 2,879,525 | 3/1959 | Fitzgerald | 9/6 |
| 3,106,058 | 10/1963 | Rice | 115/11 |
| 3,531,809 | 10/1970 | Hegg | 9/6 |
| 3,621,803 | 11/1971 | Foster | 114/67 R |
| 3,749,594 | 7/1973 | Bibb | 9/6 |

FOREIGN PATENTS OR APPLICATIONS

| | | | |
|---|---|---|---|
| 1,147,133 | 12/1968 | Germany | 9/6 |
| 1,031,166 | 5/1958 | Germany | 114/222 |
| 1,406,050 | 10/1968 | Germany | 9/6 |

*Primary Examiner*—Trygve M. Blix
*Assistant Examiner*—Stuart M. Goldstein
*Attorney, Agent, or Firm*—Blum, Moscovitz, Friedman & Kaplan

[57] ABSTRACT

A hull construction especially suited to inhibit marine growth and a method for forming same is provided. The hull construction includes an outer surface having alternating metallic areas and fiber glass areas defining the entire outer hull surface. The metal forming the metallic areas is of the type which inhibits marine growth.

16 Claims, 3 Drawing Figures

U.S. Patent    July 27, 1976    3,971,084
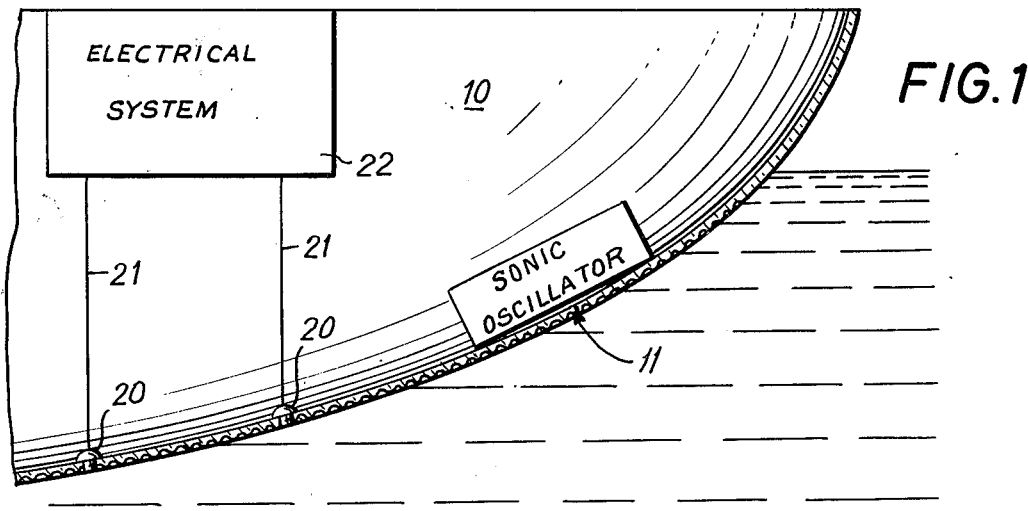
FIG.1
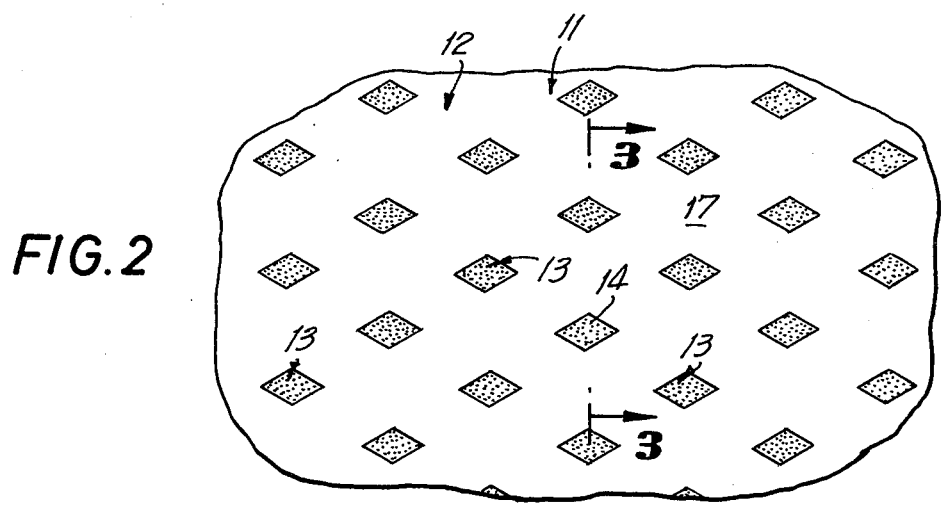
FIG.2
FIG.3
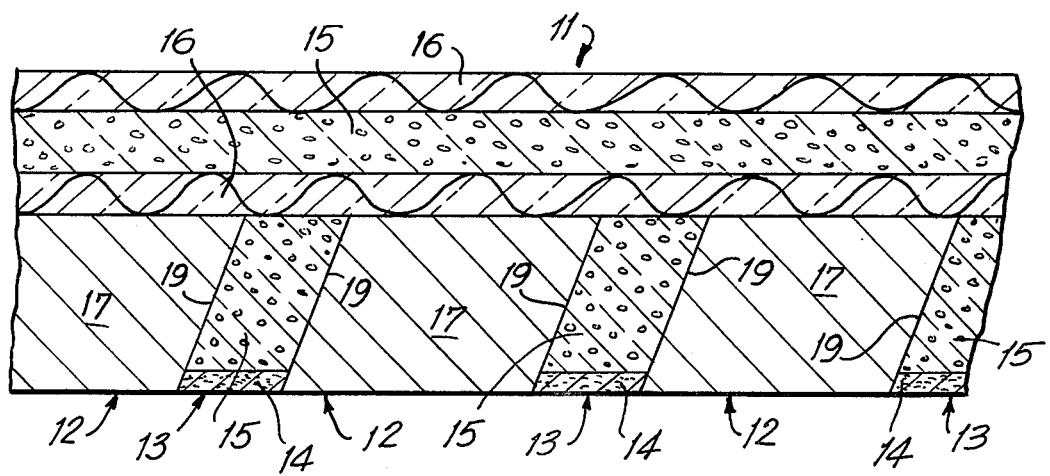

HULL CONSTRUCTION AND METHOD FOR FORMING SAME

BACKGROUND OF THE INVENTION

This invention relates generally to a hull construction for use in a boat; and a method for making same and especially to a hull construction which inhibits marine life from forming thereon. The reduction of marine growth and barnacle encrustation upon the hulls of boats has presented an age old problem to the shipbuilding art. For centuries copper sheath wooden hulls were utilized to prevent marine growth, barnacle encrustation and prevent toredos (wood borers) from damaging the hull's timbers.

Since the advent of fiber glass hulls, the problem presented by wood borers has been eliminated since such fiber glass hulls are not attacked thereby. However, the problem of marine growth and barnacle encrustation has been particularly troublesome to boats having fiber glass hulls. One way of eliminating such marine growth and barnacle encrustation has been to place a high frequency sound generator proximate the hull, a high frequency sound signal being transmitted through the hull to dislodge marine growth from the hull. Still another manner of inhibiting marine growth is to paint the bottom of a boat having a fiber glass hull with an anti-fouling bottom paint which prevents marine growth adherence to and barnacle encrustation on the hull. Nevertheless, although such painting has enjoyed limited success, the painting must be repeated often since such a coating will usually not last a full season in warmer waters and has been known to last even less time in colder waters. Accordingly, the ways of preventing marine growth and barnacle encrustation on fiber glass hulls has heretofore been less than completely satisfactory.

SUMMARY OF THE INVENTION

Generally speaking, in accordance with the invention, a hull construction having at least one fabricated layer and adapted to inhibit marine growth and barnacle encrustation on the outer surface thereof is provided. The outer surface is comprised of areas of a metallic material which inhibit the growth on or adherence to of marine life, and fiber glass hull forming materials, the metallic areas and fiberglass areas being alternated on a substantially smooth exterior surface. A preferred method for forming such a hull construction is to contour a grid formed from expanded mesh or screen in a female mold and to form fiber glass by conventional laying up techniques around and about the grid to form the outer layer of the hull construction.

The metal grid is further adapted to be utilized as a reference ground for the electrical system of a boat. Placing a sound oscillator proximate said mesh surface enhances the inhibition of marine growth since the sonic signals are better communicated through the metal than through fiber glass only as was in the prior art. Finally, use of such a wire mesh in forming a boat hull eliminates the necessity of providing a sacrificial anode protection plate on the bottom of said hull.

Accordingly, it is an object of this invention to provide an improved hull construction and method of forming same.

Another object of the invention is to provide an improved hull construction capable of inhibiting the growth of marine life thereon to extend the useful life of such hull construction.

A further object of this invention is to provide a boat with an improved hull construction wherein the use of sacrificial anode plates and ground plates are eliminated.

Still another object of the invention is to provide an improved hull construction utilizing fiber glass laying up techniques for assembling same.

Still other objects and advantages of the invention will in part be obvious and will in part be apparent from the specification.

The invention accordingly comprises the several steps and the relation of one or more of such steps with respect to each of the others, the apparatus embodying features of construction, combination and arrangement of parts which are adapted to effect such steps, and the article which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is a fragmented sectional view of a boat hull constructed in accordance with the preferred embodiment of the instant invention.

FIG. 2 is a partial plan view at an enlarged scale, of the outer surface of the hull construction depicted in FIG. 1; and FIG. 3 is a sectional view at an enlarged scale, taken along line 3—3 of FIG. 2.

DESCRIPTION OF THE PREFERRED EMBODIMENTS

Referring now to FIGS. 1 through 3, a boat 10 having hull including a novel hull construction below the water line, generally indicated at 11, is depicted. The novel hull construction is comprised of an outer surface formed of an area of metal 12, the metal being of the type which inhibits marine growth and barnacle encrustation, such as copper or alloys. The remaining alternating portions of the outer hull construction 13 are defined by the remaining spaces in the metal area 12 and are comprised of reinforced epoxy fiber glass.

In a preferred method of forming the instant hull construction a female mold (not shown) such as the type utilized for conventional fiber glass laying up techniques is employed. A copper or alloy wire mesh or wire screen 17 is placed on the mold and is contoured to the mold surface. The mesh or screen 17 is expanded so as to provide a grid having spaces therebetween. A jell coat layer 14 is then applied between the grids into contact with the female mold to form the alternating surface areas 13 with the wire mesh surface areas 12 which are also in contact with the female mold. As in conventional fiber glass laying up techniques a further layer 15 formed of rovings of chopped fiber glass, and epoxy for setting same, fill the remaining spaces between the mesh wires. A woven fiber glass mat 16 is then laid down on the layer 15 formed by the wire mesh grid 17 and the chopped rovings 15 to define the surface and outer layer of the hull. Further inner layers of the hull are formed by a conventional fiber glass hull laying up techniques which include alternating layers of chopped rovings and epoxy 15 and woven fiber glass mats 16. Upon completion of the laying up of the fiber glass layers, the female hull mold is removed thereby leaving a smooth outer surface wherein a greater percentage of the surface area thereof is metal which inhibits the growth of marine life. A preferred practical embodiment requires the metallic surface areas to be on the order of 70%, in order to insure that the metallic surfaces are larger than the size of the marine life.

It is noted that the undercuts 19 caused by manufacturing the screen or mesh and the grid caused by expanding same, effects a strong gripping of the metal and enables the metallic grids to be firmly embedded into the hull. If a solid plate of copper were placed on a boat hull to achieve the same effect there would be no way of continually attaching it to the fiber glass in order to utilize the marine growth inhibiting effect which would inure thereto.

As hereinabove noted, it has been a practice to place an oscillator near the bottom of a fiber glass boat to effect the dislodgment of marine growth from the boat's hull by conducting sonic energy through the fiber glass. By utilizing the wire grid of the instant invention, it is possible to further improve the marine growth inhibition effect of the instant invention by also utilizing a sonic generator effect. It is appreciated that placing a sonic generator near the metallic grid will cause the metallic grid to conduct the sound waves far more effectively than will fiber glass alone.

In the shipbuilding art it is also a common expedient to apply a ground plate to the bottom of a boat hull and to couple the boat's electrical system thereto in order to fix the electrical system to a common reference potential. As depicted in FIG. 1, by coupling the electrical system 22 of a boat to the wire grid by inserting conducting bolts 20 through the hull, coupling same through conductors 21 to the electrical system 22, the wire grid can be utilized as a reference ground thus eliminating the necessity of providing a grounding plate on the outside of the hull, and likewise acting as a lightning arresting-system ground.

Similarly small plates are disposed on the bottom of conventional hulls to offer cathodic protection to metallic elements in and near the boat hull. Such plates are called sacrificial anodes and are utilized to avoid the electrolytic effect caused by the sea water. It is noted that the utilization of a wire grid in a boat hull constructed in accordance with the instant invention eliminates the necessity of utilizing a metallic element as a sacrificial anode, the metal grid acting as same. Thus, the metallic grid inhibits marine growth, eliminates the use of ground plates, and eliminates the necessity of providing a sacrificial anode plate on the bottom of the hull.

Another method of forming a hull construction having a surface as depicted in FIG. 2 is to place a mask in a female hull mold and then spray thereon a copper grid. The mask is then removed and a jell coat layer is applied to the hull mold to cover the remaining surface of the mold. A preferred method of removing the mesh is to construct the mesh out of sheets of polyvinyl which would permit the mesh to be removed by flushing same with water, since polyvinyl alcohol is water soluble and would therefore be entirely removed. Thereafter, repetitive layers of chopped rovings and epoxy and woven fiber glass mats are layered until the desired thickness of the fiber glass hull is achieved. By this method, the same surface depicted in FIG. 2 is obtainable. However, because the copper is sprayed thereon, the life of such copper coating and hence the ability of the hull to inhibit marine growth and barnacle encrustation although lasting considerably longer than the previously known method of painting the hull will not last as long as the hull construction formed with the embedded mesh screen.

It will thus be seen that the object set forth above, among those made apparent from the preceding description, are efficiently attained and, since certain changes may be made in carrying out the above process, in the described product, and in the construction set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A hull construction formed of at least one fabricated layer defining the outer surface layer comprising a metal which inhibits the growth on or adherence to of marine life selected from the group consisting of copper and copper alloy, the metal defining a plurality of interstices on the outer surface; and plastic material being interleaved in said interstices defined by said metal to define an exterior surface which includes only said metal and plastic material.

2. A hull construction formed of at least one fabricated layer defining the outer surface layer comprising a metal which inhibits the growth on or adherence to of marine life, the metal defining a mesh screen, the openings therein defining alternating areas on said outer surface; and plastic material being interleaved in each of said alternating areas defined by said mesh screen to define an exterior surface which includes only said mesh screen and plastic material.

3. A hull as claimed in claim 2, wherein the undercut formed by expanding the openings in the mesh screen effect a gripping of the screen by said plastic material.

4. A hull as claimed in claim 2, wherein said plastic material is fiber glass and includes a jell coat layer defining the outermost portion of the alternating areas of the outer surface of said hull construction.

5. A hull as claimed in claim 3, wherein said at least one fabricated layer includes reinforced chopped rovings such as fiberglass and setting plastics such as epoxy, said rovings and epoxy filling in the spaces in said mesh screen.

6. A hull as claimed in claim 4, said outer surface layer of said hull construction adjacent said mesh screen and jell coat includes a woven fiber glass mat covering said entire surface formed by said mesh screen and chopped fiber glass rovings.

7. A hull as claimed in claim 3, wherein said mesh screen is copper.

8. A hull as claimed in claim 6, wherein said hull includes more than one layer, each said layer being comprised of alternating layers of chopped fiber glass rovings and epoxy and woven fiber glass mats.

9. A boat including a hull as claimed in claim 3, wherein said boat includes an electrical system, said electrical system being coupled to said mesh screen to fix same to a reference potential.

10. In a boat including a hull as claimed in claim 3, wherein the said boat includes a sonic generator, and said sonic generator is disposed proximate to said mesh screen to apply thereto a sonic signal.

11. A hull as claimed in claim 1, wherein said plastic material is fiberglass and includes a jell coat layer defining the outermost portion of the interstices of the outer surface of said hull construction.

12. A hull as claimed in claim 1, wherein said at least one fabricated layer includes reinforced chopped rovings such as fiberglass and setting plastics such as epoxy, said rovings and epoxy filling in the interstices defined by said metal.

13. A hull as claimed in claim 11, said outer surface layer of said hull construction adjacent said metal and jell coat includes a woven fiberglass mat covering said entire surface formed by said copper alloy and chopped fiberglass rovings.

14. A hull as claimed in claim 13, wherein said hull includes more than one layer, each said layer being comprised of alternating layers of chopped fiberglass rovings and epoxy and woven fiberglass mats.

15. A boat including a hull as claimed in claim 1, wherein said boat includes an electrical system, said electrical system being coupled to said metal to fix same to a reference potential.

16. A boat including a hull as claimed in claim 1, wherein said boat includes a sonic generator, and said sonic generator is disposed proximate to said metal to apply thereto a sonic signal.

* * * * *